United States Patent
Cullerton

[11] Patent Number: 5,979,497
[45] Date of Patent: Nov. 9, 1999

[54] CHECK VALVE

[76] Inventor: Thomas E Cullerton, 8909 Fenske Rd., Pardeeville, Wis. 53954

[21] Appl. No.: 08/898,221
[22] Filed: Jul. 22, 1997
[51] Int. Cl.⁶ .................................................... F16K 15/06
[52] U.S. Cl. ............................... 137/533.29; 137/533.21
[58] Field of Search ............................ 137/247.15, 514, 137/533.17, 533.21, 533.23, 533.29, 533.31, 538, 553

[56] References Cited

U.S. PATENT DOCUMENTS

| | | | |
|---|---|---|---|
| 17,503 | 6/1857 | Hyde et al. | 137/533.23 X |
| 50,394 | 10/1865 | Shield | 137/533.17 |
| 309,991 | 12/1884 | Steinberger | 137/533.17 |
| 433,019 | 7/1890 | Morris | 137/533.31 |
| 473,993 | 5/1892 | Anderson | 137/533.31 X |
| 559,504 | 5/1896 | Sullivan | 137/247.15 |
| 866,132 | 9/1907 | Henderson | 137/533.17 X |
| 1,484,527 | 2/1924 | Pace | 137/533.21 X |
| 1,994,770 | 3/1935 | King | 137/533.21 X |
| 2,071,376 | 2/1937 | Allen | 137/514 |
| 2,516,927 | 8/1950 | Steirly | 137/533.23 |
| 2,638,582 | 5/1953 | Urso et al. | 137/553 |
| 3,805,826 | 4/1974 | Westerhoff | 137/533.17 X |
| 3,921,664 | 11/1975 | Almquist | 137/553 |
| 5,036,881 | 8/1991 | Southmayd | 137/533.29 |

*Primary Examiner*—John Rivell

[57] ABSTRACT

The valve's flow control is provided by sliding concentric tubes which make or break metal to metal contact in reaction to pressure changes in the inlet and outlet piping.

Power for bi-directional operation of the valve is provided entirely by the forces of fluid pressure and gravity, with no mechanical or electrical means of assistance (such as springs, rods, pistons, screws, or electromagnets) being required.

The valve's status is recognized by means of a proximity sensor.

When the concave surface of the stopper drops to the slightly rounded (convex) edge of the tube (with the radius of the stopper's concave surface being greater than that of the tube's convex surface), a tight and complete seal is made. That seal remains until the surfaces are separated. Separation occurs at the instant the stopper starts to rise in response to the incoming fluid pressure exceeding the opposing forces of gravity and any reverse fluid pressure acting against the stopper.

1 Claim, 2 Drawing Sheets

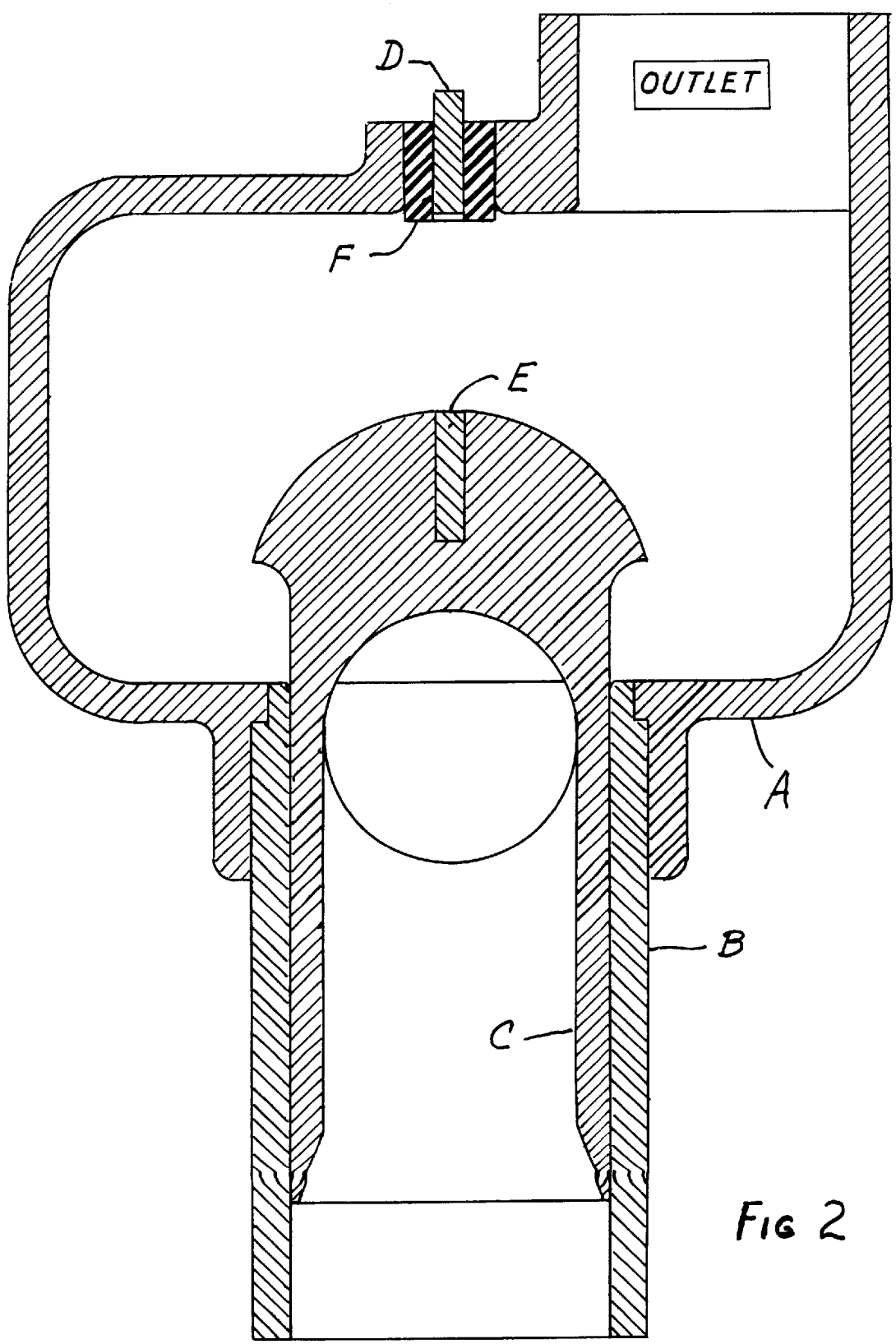

CHECK VALVE

SUMMARY OF INVENTION

The invention provides a non-clogging valve which readily allows fluids and suspended solids to flow in one direction while open, and prevents a flow in the opposite direction when closed. The flow is unrestricted from inlet to outlet, enabling even thick or viscous fluids, such as sludges, sewage, and slurries to pass all the way through the valve. If a pump (or other fluid pressure source) is connected via piping to the valve's inlet, the valve automatically opens when the pump (or pressure source) forces fluid into it. As soon as the pump stops pumping (or the pressure source is removed) the valve automatically provides positive shut-off. External (or remote) monitoring of the valve's status is possible because of a proximity sensor built into the valve's internal structure.

DRAWINGS

FIG. 2 is the sectional view along the line indicated in FIG. 1.

DESCRIPTION

Figure 1:
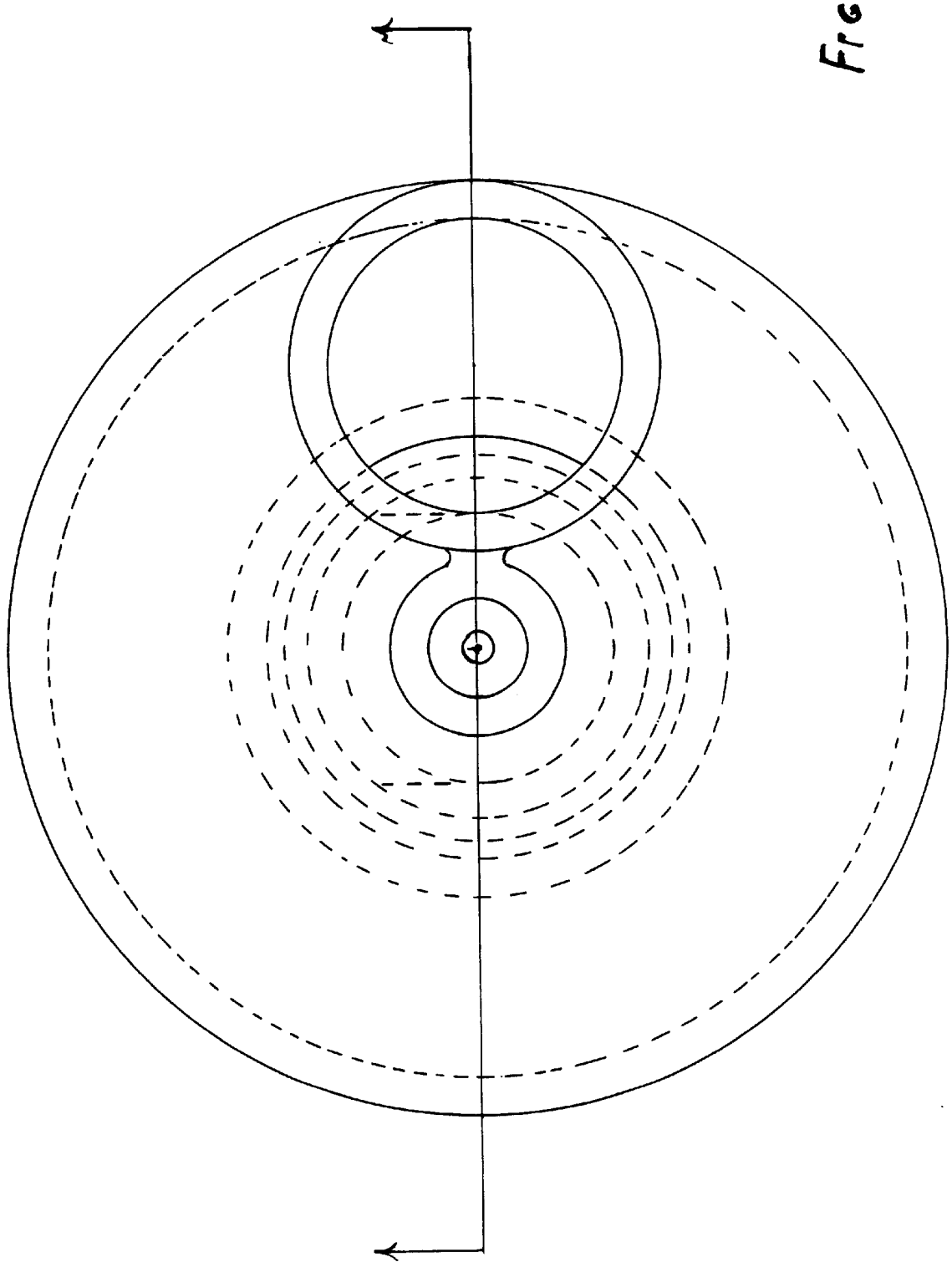
FIG. 1 is a top view.

The valve consists of 3 main parts as identified in FIG. 2; A the body, B the tube, and C the stopper. It also contains a proximity sensor including an actuator located in the stopper and a sensor located in the body. In FIG. 2, D is the sensor and E is the actuator. To assemble the valve, the stopper is inserted into the tube. The tube is then attached to the body to extend within the body to the same level as the body bottom surface. When the valve is installed for use, the inlet and outlet ports of the body are connected into the system piping such that the outlet is at the top.

In operation, the force of the fluid entering the valve raises the stopper so that its outlet hole is exposed to the large chamber in the body of the valve. This permits the fluid to flow out from the stopper and into the body chamber, from where it passes into the system piping which is connected to the top of the valve body (at its outlet port). Whenever the force of the entering fluid is removed (such as when pump operation ceases), the stopper immediately falls downward due to the combined weight of the stopper and of all the matter, fluid and solid, above the stopper in this valve and in the system piping above the valve. As the stopper completes its fall into the tube, its outlet hole is covered by the tube, thus quickly stopping reverse fluid flow. In FIG. 2, the stopper is shown at a point in its travel when its outlet hole is partially open.

The inside diameter of the stopper determines the ball size rating of the valve because there are no impediments or smaller dimensions to prevent solid objects from passing through and exiting the valve.

When the stopper rises to the point at which its outlet hole is completely open, the actuator, part E, causes the sensor, part D, to change its status. When the stopper drops so that its outlet hole is no longer completely open, the status of the sensor changes. Thus the status of the sensor reflects the status of the valve. The status of the sensor can be externally or remotely observed and recorded. Knowledge of the valve's status permits easier diagnosis and repair of the entire piping system, and can provide the necessary feedback for automatic control systems.

Fluids such as sewage can be handled without clogging by the valve because it has no sites where solid and semi-solid particles can be snagged. With no gates, flappers, gaskets, etc., the reduction in periodic maintenance is a big improvement over valves now in use. Among the features of my valve are these:

In the case of part C, the stopper,
- a. The passageway, a tunnel, through the stopper is rounded and smooth and maintains its ball size rating through its 90 degree change in direction so that there is no place to snag solid or semi-solid particles.
- b. The stopper reacts solely to the fluid flow from a pressure source so that no assistance is required from any other internal or external force to open or close the valve.
- c. Immediately upon cessation of the incoming fluid pressure, the stopper falls, thus closing off the passageway with a shearing action which halts virtually all of the reverse flow.
- d. The valve is completely closed when the curved surface of the stopper (which increases its diameter) meets the rounded edge of the part B tube. Having unlike radii those two surfaces make contact at only one point and create a tight seal. Thus there is no flat to flat surface on which a grain of sand or other particle at rest could prevent complete closure.
- e. The curved surfaces described in "d" above are not in the path of the fluid flow, therefore those surfaces are not subject to any erosion or other degradation from the fluid flow.
- f. The stopper is free to revolve and does so in reaction to the fluid flow. Thus the potential wear from the sliding of the stopper in the tube is spread all around the entire circumference of both the stopper and its mating surface on the tube.

In the case of part A, the body,
- a. There is enough space all around the stopper in the chamber of the body to permit passage of the same size ball that can pass through the stopper. Buildup of solid particles in that space is inhibited due to the flushing action caused by the stopper as it slowly revolves. The stopper can revolve because there is no mechanical restriction preventing its reaction to the natural swirling of the flowing fluid.
- b. A simple method of remote monitoring of the valve's status without adding any obstruction to the fluid flow. Knowledge of the status of the valve greatly simplifies determination of whether or not the entire piping system is operating as expected in accord with the fluid pressure source.
- c. Placement of shock absorbing material, part F, in the body reduces the impact to the body when the stopper rises. This also minimizes the sound resulting from the impact.
- d. The complete absence of parts such as springs, flappers, levers, pistons, or other protrusions into the fluid passageway allows solid and semi-solid objects to be carried freely through the valve body without getting snagged.

What is claimed is:

1. A check valve assembly comprising one body, one tube and one stopper, one end of the tube connected to supply piping, the other end of the tube protruding into the body such that a top edge of the tube and an inside surface of a bottom of the body are at the same level, the stopper having one portion with a diameter slightly smaller than an inside diameter of the tube and another portion with a diameter greater than the inside diameter of the tube so that the stopper rests down inside the tube when the valve is closed, the stopper including a tunnel with a constant cross sectional dimension that starts at one end of the stopper and runs upward inside the stopper towards the other end of the stopper wherein said tunnel turns outward forming a tunnel opening in a sidewall of the stopper, said tunnel opening being completely out of the tube and a top of the stopper being in contact with an inside top surface of the body when the valve is open and an outlet hole at the inside top surface of the body being connected to downstream piping.

* * * * *